United States Patent
Kashihara

(10) Patent No.: US 7,737,208 B2
(45) Date of Patent: Jun. 15, 2010

(54) WATER BASE RESIN COMPOSITION, PROCESS FOR PRODUCING THE SAME, PAINT, INK, ADHESIVE, SEALANT AND PRIMER

(75) Inventor: Kenji Kashihara, Takasago (JP)

(73) Assignee: Toyo Kasei Kogyo Company Limited, Osaka (JP)

( * ) Notice: Subject to any disclaimer, the term of this patent is extended or adjusted under 35 U.S.C. 154(b) by 317 days.

(21) Appl. No.: 11/658,274

(22) PCT Filed: Jul. 20, 2005

(86) PCT No.: PCT/JP2005/013297

§ 371 (c)(1),
(2), (4) Date: Jan. 24, 2007

(87) PCT Pub. No.: WO2006/011402

PCT Pub. Date: Feb. 2, 2006

(65) Prior Publication Data

US 2008/0287594 A1    Nov. 20, 2008

(30) Foreign Application Priority Data

Jul. 27, 2004   (JP)   ............... 2004-218797

(51) Int. Cl.
  *C08F 2/24*   (2006.01)
(52) U.S. Cl. ............... 524/458; 524/502; 524/504
(58) Field of Classification Search ............. 524/502, 524/504
See application file for complete search history.

(56) References Cited

U.S. PATENT DOCUMENTS 3,706,722 A  * 12/1972  Nelson et al. ........... 526/216
5,534,577 A    7/1996  Namba et al. ............ 524/377
5,728,767 A    3/1998  Kanetou et al. .......... 524/504
5,916,948 A  *  6/1999  Kimura ................... 524/458
6,831,115 B2 * 12/2004  Williams et al. ......... 522/113
2002/0198326 A1 * 12/2002  Aoyama et al. .......... 525/240

FOREIGN PATENT DOCUMENTS

| | | |
|---|---|---|
| EP | 0 767 186 A | 4/1997 |
| JP | 59-75958 A | 4/1984 |
| JP | 60-99138 A | 6/1985 |
| JP | 6-16746 A | 1/1994 |
| JP | 6-80844 A | 3/1994 |
| JP | 6-256592 A | 9/1994 |
| JP | 8-12913 A | 1/1996 |
| JP | 8-67726 A | 3/1996 |
| JP | 10-273570 A | 10/1998 |
| JP | 2004-107539 A | 4/2004 |

* cited by examiner

*Primary Examiner*—David Wu
*Assistant Examiner*—Vu Nguyen
(74) *Attorney, Agent, or Firm*—Kubovcik & Kubovcik

(57) ABSTRACT

An aqueous resin composition obtained by dissolving 100 parts by mass of acid-modified polyolefin and 5 to 60 parts by mass of surfactant in 15 to 1900 parts by mass of polymerizable monomer, adding water in the presence of basic compound to perform phase inversion emulsification, and polymerizing the monomer;

an aqueous resin composition obtained by dissolving 100 parts by mass of acid-modified polyolefin and 5 to 60 parts by mass of surfactant in a first polymerizable monomer, adding water in the presence of basic compound to perform phase inversion emulsification, polymerizing the first monomer to form a resin composition, adding and polymerizing a second polymerizable monomer to the resin composition; the monomers being used in a total amount of 15 to 1900 parts by mass per 100 parts by mass of the acid-modified polyolefin; and paints, inks, adhesives, sealants and primers containing such composition as an active ingredient.

18 Claims, No Drawings

WATER BASE RESIN COMPOSITION, PROCESS FOR PRODUCING THE SAME, PAINT, INK, ADHESIVE, SEALANT AND PRIMER

This application is a 371 of international application PCT/JP2005/013297, which claims priority based on Japanese patent application No. 2004-218797 filed Jul. 27, 2004, which is incorporated herein by reference.

TECHNICAL FIELD

The present invention relates to an aqueous resin composition used to protect and/or decorate polyolefin substrates, and a process for producing the same.

BACKGROUND ART

Generally, polyolefin resins such as polypropylenes, polyethylenes, ethylene-propylene copolymers, ethylene-propylene-diene copolymers, poly-4-methyl-1-pentenes, etc. are relatively inexpensive and have excellent performance in terms of, for example, chemical resistance, water resistance, heat resistance, etc. Therefore, polyolefin resins are used in a wide variety of applications such as raw materials for automotive parts, electronic parts, building materials, packaging films, and the like. However, since polyolefin resins are crystalline and non-polar, it is difficult to coat or bond polyolefin resins.

To coat or bond such low-adhesion polyolefin resins, chlorinated polyolefins having strong adhesion to polyolefin resins have been used as binder resins (JP 59-75958 A and JP 60-99138 A). Further, acrylic, urethane and/or polyester resins have been mixed or graft-polymerized with chlorinated polyolefins to obtain binder compositions for coating or bonding polyolefin resins, thereby compensating for the drawbacks of chlorinated polyolefins (JP 6-16746 A and JP 8-12913 A).

However, such binder compositions are mostly used in the form of solutions in organic solvents such as toluene, xylene, etc., and large amounts of organic solvents are released into the atmosphere during application of such compositions. Thus, such binder compositions are unfavorable from the viewpoint of the environment and health. Further, such binder compositions, which contain chlorine atoms, are also unfavorable from the viewpoint of toxic substance generation accompanying incineration.

Aqueous resin compositions which are organic solvent-free and whose resins contain no chlorine have been proposed (JP 6-256592 A and JP 2004-107539 A). However, such compositions have a problem in that emulsification steps in their production processes sometimes involve solvent removal that requires a long period of time, resulting in high cost. Moreover, polyolefin resins intrinsically have low polarity, and thus, when mixed with acrylic, urethane, epoxy and/or polyester resins, such polyolefin resins do not exhibit the desired properties due to low compatibility with these resins.

DISCLOSURE OF INVENTION

Problems to be Solved by the Invention

An object of the present invention is to provide an aqueous resin composition for paints, inks, adhesives, sealants and/or primers, the composition having good adhesion to polyolefin substrates and good compatibility with various polar resins, and being organic solvent-free.

Means for Solving the Problems

The present invention provides the following aqueous resin compositions, production processes therefor, paints, inks, adhesives, sealants and primers.

1. An aqueous resin composition obtained by dissolving 100 parts by mass of acid-modified polyolefin and 5 to 60 parts by mass of surfactant in 15 to 1900 parts by mass of polymerizable monomer, adding water in the presence of basic compound to perform phase inversion emulsification, and then polymerizing the polymerizable monomer.

2. The aqueous resin composition according to item 1, wherein the acid-modified polyolefin has a weight average molecular weight of 3000 to 200000 as measured by high temperature GPC.

3. The aqueous resin composition according to item 1, wherein the acid-modified polyolefin is obtained by graft-copolymerizing with a polyolefin 0.4 to 10 mass % of at least one member selected from unsaturated carboxylic acids and anhydrides thereof.

4. A process for producing an aqueous resin composition, the process comprising dissolving 100 parts by mass of acid-modified polyolefin and 5 to 60 parts by mass of surfactant in 15 to 1900 parts by mass of polymerizable monomer, adding water in the presence of basic compound to perform phase inversion emulsification, and then polymerizing the polymerizable monomer.

5. A paint for polyolefin films, sheets or molded articles, the paint comprising the aqueous resin composition according to item 1 as an active ingredient.

6. An ink for polyolefin films, sheets or molded articles, the ink comprising the aqueous resin composition according to item 1 as an active ingredient.

7. An adhesive for polyolefin films, sheets or molded articles, the adhesive comprising the aqueous resin composition according to item 1 as an active ingredient.

8. A sealant for polyolefin films, sheets or molded articles, the sealant comprising the aqueous resin composition according to item 1 as an active ingredient.

9. A primer for polyolefin substrates, the primer comprising the aqueous resin composition according to item 1 as an active ingredient.

10. An aqueous resin composition obtained by dissolving 100 parts by mass of acid-modified polyolefin and 5 to 60 parts by mass of surfactant in a first polymerizable monomer, adding water in the presence of basic compound to perform phase inversion emulsification, polymerizing the first polymerizable monomer to form a resin composition, adding a second polymerizable monomer to the resin composition, and then polymerizing the second polymerizable monomer; the first and second polymerizable monomers being used in a total amount of 15 to 1900 parts by mass per 100 parts by mass of the acid-modified polyolefin.

11. The aqueous resin composition according to item 10, wherein the acid-modified polyolefin has a weight average molecular weight of 3000 to 200000 as measured by high temperature GPC.

12. The aqueous resin composition according to item 10, wherein the acid-modified polyolefin is obtained by graft-copolymerizing with a polyolefin 0.4 to 10 mass % of at least one member selected from unsaturated carboxylic acids and anhydrides thereof.

13. A process for producing an aqueous resin composition, the process comprising the steps of dissolving 100 parts by mass of acid-modified polyolefin and 5 to 60 parts by mass of surfactant in a first polymerizable monomer, adding water in the presence of basic compound to perform phase inversion emulsification, polymerizing the first polymerizable monomer to form a resin composition, adding a second polymerizable monomer to the resin composition, and polymerizing the second polymerizable monomer;

the first and second polymerizable monomers being used in a total amount of 15 to 1900 parts by mass per 100 parts by mass of the acid-modified polyolefin.

14. A paint for polyolefin films, sheets or molded articles, the paint comprising the aqueous resin composition according to item 10 as an active ingredient.

15. An ink for polyolefin films, sheets or molded articles, the ink comprising the aqueous resin composition according to item 10 as an active ingredient.

16. An adhesive for polyolefin films, sheets or molded articles, the adhesive comprising the aqueous resin composition according to item 10 as an active ingredient.

17. A sealant for polyolefin films, sheets or molded articles, the sealant comprising the aqueous resin composition according to item 10 as an active ingredient.

18. A primer for polyolefin substrates, the primer comprising the aqueous resin composition according to item 10 as an active ingredient.

The present invention is described below in detail.

The aqueous resin composition of the present invention is obtained by dissolving an acid-modified polyolefin and surfactant in a polymerizable monomer, performing phase inversion emulsification in an aqueous medium in the presence of basic compound, and then polymerizing the polymerizable monomer. Further, a second polymerizable monomer may be subsequently added and polymerized.

Acid-modified polyolefins usable in the present invention can be obtained, for example, by graft-copolymerizing at least one member selected from $\alpha,\beta$-unsaturated carboxylic acids and anhydrides thereof, with at least one member selected from polypropylenes, propylene-$\alpha$-olefin copolymers, polyethylenes, ethylene-$\alpha$-olefin copolymers, poly-1-butenes, and 1-butene-$\alpha$-olefin copolymers.

As used herein, propylene-$\alpha$-olefin copolymers are copolymers of propylene as a main component with $\alpha$-olefin(s). Examples of $\alpha$-olefins include $C_2$ or $C_{5-20}$ $\alpha$-olefins such as ethylene, 1-pentene, 1-hexene, 1-heptene, 1-octene, 1-decene, 1-dodecene, 1-hexadecene, 4-methyl-1-pentene, etc. The propylene content of such a propylene-$\alpha$-olefin copolymer is preferably at least 50 mol %. Propylene contents of less than 50 mol % result in poor adhesion to polypropylene substrates.

Ethylene-$\alpha$-olefin copolymers are copolymers of ethylene as a main component with $\alpha$-olefin(s). Examples of $\alpha$-olefins include $C_{3-20}$ $\alpha$-olefins such as propylene, 1-butene, 1-pentene, 1-hexene, 1-heptene, 1-octene, 1-decene, 1-dodecene, 1-hexadecene, 4-methyl-1-pentene, etc. The ethylene content of such an ethylene-$\alpha$-olefin copolymer is preferably at least 75 mol %. Ethylene contents of less than 75 mol % result in poor adhesion to polyethylene substrates.

1-Butene-$\alpha$-olefin copolymers are copolymers of 1-butene as a main component with $\alpha$-olefin(s). Examples of $\alpha$-olefins include $C_2$ or $C_{5-20}$ $\alpha$-olefins such as ethylene, 1-pentene, 1-hexene, 1-heptene, 1-octene, 1-decene, 1-dodecene, 1-hexadecene, 4-methyl-1-pentene, etc. The 1-butene content of such a 1-butene-$\alpha$-olefin copolymer is preferably at least 65 mol %. 1-Butene contents of less than 65 mol % result in poor adhesion to polypropylene substrates and/or poly-1-butene substrates.

Examples of $\alpha,\beta$-unsaturated carboxylic acids and anhydrides thereof that are graft-copolymerized with polyolefins include maleic acid, maleic anhydride, fumaric acid, citraconic acid, citraconic anhydride, mesaconic acid, itaconic acid, itaconic anhydride, aconitic acid, aconitic anhydride, himic anhydride, etc., with maleic anhydride and itaconic anhydride being preferable.

The $\alpha,\beta$-unsaturated carboxylic acid and/or $\alpha,\beta$-unsaturated carboxylic anhydride content of the acid-modified polyolefin is preferably 0.4 to 10 mass %. When the content is more than 10 mass %, the resin becomes highly hydrophilic and the resulting composition is likely to form a coating film with poor water resistance. When the content is less than 0.4 mass %, phase inversion emulsification may become difficult.

The graft copolymerization of at least one member selected from $\alpha,\beta$-unsaturated carboxylic acids and anhydrides thereof with the polyolefin(s) can be carried out by known methods, such as a method in which the polyolefin(s) is melted by heating to a temperature not lower than the melting point in the presence of a radical initiator to perform a reaction (melting method); a method in which the polyolefin(s) is dissolved in an organic solvent and heated with stirring in the presence of a radical initiator to perform a reaction (solution method); etc.

The acid-modified polyolefin for use in the present invention preferably has a weight average molecular weight of 3000 to 200000 as measured by high temperature GPC (gel permeation chromatography). An acid-modified polyolefin having a weight average molecular weight of more than 200000 is not readily dissolved in the polymerizable monomer, making smooth phase inversion emulsification difficult. When the acid-modified polyolefin has a weight average molecular weight of less than 3000, the resin has insufficient coagulation ability and is likely to have poor properties.

Weight average molecular weight measurement by high temperature GPC can be carried out by known methods using commercial instruments, with ortho-dichlorobenzene as a solvent and polystyrene as standards. Specifically, it can be carried out using ortho-dichlorobenzene as a solvent and using a GPC 150-C plus (product of Waters) at 140° C. GMH6-HT and GMH6-HTL (products of Tosoh Corp.) can be used as columns. The weight average molecular weight is calculated using polystyrene with known molecular weights as standards.

Surfactants that can be used in the present invention include nonionic surfactants, anionic surfactants, cationic surfactants, and amphoteric surfactants. Among these, from the viewpoint of the diameter of dispersed particles, and the water resistance of coating films obtained from the resulting composition, it is preferable to use a nonionic surfactant or anionic surfactant, and it is particularly preferable to use a nonionic surfactant.

Nonionic surfactants include, for example, polyoxyethylene alkyl ethers, polyoxypropylene alkyl ethers, polyoxyethylene alkylphenyl ethers, polyoxypropylene alkylphenyl ethers, polyoxyethylene styrenated phenyl ethers, polyoxypropylene styrenated phenyl ethers, polyoxyethylene fatty acid esters, polyoxypropylene fatty acid esters, polyoxyethylene sorbitan fatty acid esters, polyoxypropylene sorbitan fatty acid esters, polyoxyethylene alkylamine ethers, polyoxypropylene alkylamine ethers, polyoxyethylene lanolin alcohol ethers, polyoxypropylene lanolin alcohol ethers, polyoxyethylene lanolin fatty acid esters, polyoxypropylene lanolin fatty acid esters, polyoxyethylene-oxypropylene block copolymers, etc.

Anionic surfactants include, for example, higher alkyl sulfuric acid esters, alkylaryl polyoxyethylene sulfuric acid ester salts, higher fatty acid salts, alkylaryl sulfonic acid salts, alkyl phosphoric acid ester salts, etc.

Reactive surfactants having polymerizable double bonds in their molecules can also be used as surfactants. Examples of such reactive surfactants include Adekaria Soap NE-10, NE-20, NE-30, NE-40, and SE-10N (products of Asahi Denka Kogyo K.K.); Aqualon RN-20, RN-30, RN-50, HS-10, and HS-20 (products of Dai-Ichi Kogyo Seiyaku Co., Ltd.); Eleminol JS-2 and RS-30 (products of Sanyo Chemical Industries, Ltd.), etc.

Such surfactants can be used singly or in combination.

The amount of surfactant used in the present invention is 5 to 60 parts by mass per 100 parts by mass of the acid-modified polyolefin. When the amount is less than 5 parts by mass, phase inversion emulsification becomes difficult. When the amount is more than 60 parts by mass, the resulting composition has poor water resistance.

Polymerizable monomers for use in the present invention are not limited as long as they can dissolve acid-modified polyolefins as mentioned above. Examples of usable polymerizable monomers include methyl(meth)acrylate, ethyl (meth)acrylate, n-propyl (meth)acrylate, isopropyl(meth) acrylate, n-butyl (meth)acrylate, isobutyl(meth)acrylate, tert-butyl (meth)acrylate, 2-ethylhexyl(meth)acrylate, cyclohexyl (meth)acrylate, tert-butylcyclohexyl(meth)acrylate, lauryl (meth)acrylate, stearyl(meth)acrylate, behenyl (meth)acrylate, isobornyl(meth)acrylate, dicyclopentanyl (meth)acrylate, dicyclopentenyl(meth)acrylate, glycidyl (meth)acrylate, methylglycidyl(meth)acrylate, 3,4-epoxycyclohexanemethyl methacrylate, tetrahydrofurfuryl (meth)acrylate, 1,4-butanediol di(meth)acrylate, neopentyl glycol di(meth)acrylate, 1,6-hexanediol di(meth)acrylate, 1,9-nonanediol di(meth)acrylate, 1,10-decanediol di(meth) acrylate, 3-methyl-1,5-pentanediol (meth)acrylate, 2-butyl-2-ethyl-1,3-propanediol diacrylate, dimethylol-tricyclodecane di(meth)acrylate, trimethylolpropane tri(meth)acrylate, and other acrylic monomers; and styrene, α-methylstyrene, paramethylstyrene, divinylbenzene, and other styrene monomers. Other monomers that can be used in combination with the above monomers include vinyl acetate and the like. Such monomers can be used singly or in combination.

Among acrylic monomers, those having polar groups in their molecules, such as acid components, cannot readily dissolve acid-modified polyolefins. Examples of such acrylic monomers include acrylic acid, methacrylic acid, 2-hydroxyethyl (meth)acrylate, 2-hydroxypropyl(meth)acrylate, 2-hydroxybutyl (meth)acrylate, 4-hydroxybutyl(meth)acrylate, 2-methacryloyloxyethyl acid phosphate, 2-acryloyloxyethyl acid phosphate, polyethylene glycol mono(meth)acrylate, polyethylene glycol di(meth)acrylate, polypropylene glycol mono(meth)acrylate, polypropylene glycol di(meth)acrylate, polytetramethylene glycol mono(meth)acrylate, polytetramethylene glycol di(meth)acrylate, dimethylaminoethyl(meth) acrylate, diethylaminoethyl (meth)acrylate, etc. Therefore, when using such monomers, it is preferable to mix them suitably with the above-mentioned monomers that can readily dissolve acid-modified polyolefins.

As used herein, "(meth)acrylate" means "acrylate or methacrylate", "(meth)acrylic acid" means "acrylic acid or methacrylic acid", and "(meth)acryloyl group" means "acryloyl group or methacryloyl group."

The amount of polymerizable monomer used in the present invention is 15 to 1900 parts by mass per 100 parts by mass of the acid-modified polyolefin. When the amount is less than 15 parts by mass, dissolution of the acid-modified polyolefin becomes difficult, failing to carry out phase inversion emulsification smoothly. When the amount is more than 1900 parts by mass, the acid-modified polyolefin content is too small, resulting in insufficient adhesion of the resulting composition to polyolefin substrates.

In the present invention, a basic compound is required for performing the phase inversion emulsification of the acid-modified polyolefin. The presence of basic compound in the system makes it possible to improve the dispersibility of the acid-modified polyolefin. Examples of basic compounds include sodium hydroxide, potassium hydroxide, sodium carbonate, potassium carbonate, ammonium carbonate, and other inorganic basic compounds; triethylamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, methyliminobispropylamine, 3-methoxypropylamine, monoethanolamine, diethanolamine, triethanolamine, morpholine, N-methylmorpholine, N-ethylmorpholine, 2-amino-2-methyl-1-propanol, 2-dimethylamino-2-methyl-1-propanol, and other amines; ammonia; etc.

The amount of basic compound is preferably 0.3 to 4.0 chemical equivalents, and more preferably 0.7 to 2.5 chemical equivalents, per carboxy group of the acid-modified polyolefin. When the amount is less than 0.3 chemical equivalents, the effects of the presence of basic compound may not be exhibited. When the amount is more than 4.0 chemical equivalents, too large an amount of basic compound remains in the dry product of the resulting composition.

In the present invention, phase inversion emulsification is carried out by adding water dropwise to a solution of an acid-modified polyolefin and surfactant in a polymerizable monomer, with stirring and in the presence of basic compound. At the beginning of the dropwise addition, the oil phase comprising the acid-modified polyolefin and polymerizable monomer is the continuous phase (W/O type), but during the addition, the water becomes the continuous phase and the oil phase comprising the acid-modified polyolefin and polymerizable monomer becomes the dispersed phase (O/W type). That is, the continuous phase and dispersed phase invert (phase inversion) and the dispersed phase is converted into fine particles. After conversion into fine particles, the polymerizable monomer is polymerized to thereby form a final aqueous dispersion. Such a dispersion method in the present invention uses no organic solvent and therefore requires no solvent removal step or special dispersion equipment.

The amount of water added to perform the phase inversion emulsification of the acid-modified polyolefin is preferably such that the final solids content after the polymerization of the polymerizable monomer is 15 to 50 mass %. When the amount is less than 15 mass %, drying of the resulting composition may require a high temperature and long period of time. Amounts more than 50 mass % may make the phase inversion emulsification difficult.

After phase inversion emulsification of the acid-modified polyolefin, the polymerizable monomer contained in the emulsion is polymerized. Polymerization initiator(s) is used to efficiently carry out the polymerization reaction. It is preferable to use a conventional amount of polymerization initiator as is often used in conventional emulsion polymerizations. Examples of such polymerization initiators include potassium persulfate, ammonium persulfate and hydrogen peroxide; 4,4'-azobis(4-cyanovaleric acid), 2,2'-azobis[N-(2-carboxyethyl)-2-methylpropionamide], 2,2'-azobis[2-methyl-N-[2-(1-hydroxybutyl)]propionamide], 2,2'-azobis[2-methyl-N-(2-hydroxyethyl)propionamide], and other azo initiators; benzoyl peroxide, t-butylperoxy 2-ethylhexanoate, 1,1-bis(tert-butyl peroxy)-3,3,5-trimethylcyclohexane, t-butyl peroxybenzoate, di-t-butyl peroxide, t-butyl hydroperoxide, cumene hydroperoxide, p-menthane hydroperoxide, diisopropylbenzene hydroperoxide, and other peroxide initiators; etc. Such initiators can be used singly or in combination. Also usable are redox initiators including, for example, combinations of polymerization initiators as mentioned above with reducing agents (e.g., sulfites, hydrogensulfites, low ionic valency salts of cobalt, iron, copper, etc.).

The polymerization conditions generally cannot be specified since they vary according to the types of polymerizable monomer and polymerization initiator, but the polymerization temperature is usually 20 to 100° C., and preferably 50 to 80° C. The polymerization time is usually 1 to 8 hours. For rapid polymerization, it is preferable to replace the atmosphere in the polymerization system with an inert gas such as nitrogen gas.

As mentioned above, the resin particles in the aqueous resin composition of the present invention are produced by dissolving an acid-modified polyolefin in a polymerizable monomer, followed by polymerization of the polymerizable monomer. Each of the resin particles has the acid-modified polyolefin in its central portion, which is surrounded by a polymer derived from the polymerizable monomer.

A second polymerizable monomer may be added to the thus obtained resin composition and polymerized, to increase the proportion of polymer derived from polymerizable monomers. Such a process is advantageous in that it increases the proportion of polymerizable monomer component to the acid-modified polyolefin, and that a large amount of heat that would be generated during the polymerization of a large amount of monomer can be dispersed. Further, when the first polymerizable monomer used for dissolving the acid-modified polyolefin and the second polymerizable monomer added later are different from each other, it is possible to impart multiple functions to the resin particles. Specific examples of second polymerizable monomers include monomers mentioned as first polymerizable monomers used to dissolve the acid-modified polyolefin. In this process, monomers that do not readily dissolve the acid-modified polyolefin can be used as the second polymerizable monomer. The amount of second polymerizable monomer to be used is such that the total amount of first and second polymerizable monomers is 15 to 1900 parts by mass per 100 parts by mass of acid-modified polyolefin. Specifically, it is preferable to use 14.5 to 300 parts by mass of first polymerizable monomer and 0.5 to 1600 parts by mass of second polymerizable monomer, per 100 parts by mass of acid-modified polyolefin.

The thus obtained resin particles in the aqueous resin composition preferably have a mean particle diameter of not more than 0.5 μm, and more preferably not more than 0.2 μm. Resin particles with a mean particle diameter of more than 0.5 μm are not preferable since they may cause deficiencies in applied coatings, thereby adversely affecting their properties. In particular, it becomes difficult to use the resin composition as a topcoat composition.

The aqueous resin composition of the present invention can be used by itself as a clear varnish, and various paint additives and/or other resin emulsions can be blended in such amounts that do not impair the adhesion to polyolefin substrates, to improve the film performance in terms of, for example, film-forming properties, film hardness, weather resistance, flexibility, etc. Examples of usable additives include film-forming auxiliaries such as propylene glycol monopropyl ether, dipropylene glycol monomethyl ether, butyl propylene diethylene glycol; antifoaming agents; antisagging agents; wetting agents; ultraviolet ray absorbers; etc. In particular, addition of acrylic emulsion(s) and/or urethane emulsion(s) makes it possible to improve the film performance in terms of weather resistance, water resistance, film strength, flexibility, etc.

Further, the aqueous resin composition of the present invention may contain, as necessary, tackifiers such as aqueous dispersions of rosins, dammars, polymerized rosins, hydrogenated rosins, ester rosins, rosin-modified maleic acid resins, polyterpene resins, petroleum resins, cyclopentadiene resins, phenol resins, xylene resins, coumarone indene resins, etc., to thereby improve the drying properties and polyolefin substrate adhesion of the coating film. The amount of tackifier to be added is, based on the solids in the dispersion (tackifier), preferably 5 to 100 parts by mass, and more preferably 10 to 50 parts by mass, per 100 parts by mass of solids of the resin composition. Amounts less than 5 parts by mass may fail to exhibit the effects of addition. Amounts more than 100 parts by mass are too great, and may decrease, rather than increase, adhesion.

The aqueous resin composition of the present invention can be advantageously used for paints for various polyolefin substrates such as polypropylenes and the like, but usable substrates are not limited thereto and the composition can be applied to other plastics, woods, metals, etc. The method for application is not limited. The applied coating can be dried at room temperature, but is preferably dried at 30 to 120° C., and more preferably at 60 to 100° C.

EFFECTS OF THE INVENTION

Since the resin particles contained in the aqueous resin composition of the present invention are finely dispersed, the aqueous resin composition of the present invention has excellent storage stability, and aqueous paints prepared using the aqueous resin composition of the present invention have excellent adhesion to polyolefin substrates.

Further, the aqueous resin composition production process of the present invention uses no organic solvent and thus requires no solvent removal step. Therefore, the process achieves good cost performance on an industrial scale.

The aqueous resin composition of the present invention is capable of forming a coating film that exhibits excellent adhesion to polyolefin substrates in the form of films, sheets, molded articles, etc., and has excellent water resistance and excellent chemical resistance. Thus, the aqueous resin composition is useful for paints, inks, adhesives, sealants, and primers.

BEST MODE FOR CARRYING OUT THE INVENTION

The following Examples illustrate the present invention in further detail, and are not intended to limit the scope of the invention.

In the following, the weight average molecular weight measurement by high temperature GPC was carried out using a GPC 150-C plus (product of Waters) at 140° C., and ortho-dichlorobenzene as a solvent. GMH6-HT and GMH6-HTL (products of Tosoh Corp.) were used as columns. Weight average molecular weights were calculated using polystyrene with known molecular weights as standards.

The mean particle diameter was measured with a SALD-2000A laser diffraction particle size distribution measuring apparatus (product of Shimadzu Corp.).

Production Example 1

An autoclave equipped with a stirrer was charged with 280 g of polypropylene, 25 g of maleic anhydride, 7 g of dicumyl peroxide, and 420 g of toluene, and purged with nitrogen for about 5 minutes. Subsequently, a reaction was performed at 140° C. for 5 hours with heating and stirring. After completion of the reaction, the reaction mixture was poured into a large amount of methyl ethyl ketone to precipitate resin. The resin was washed with methyl ethyl ketone several times to remove unreacted maleic anhydride. The resulting resin was dried under reduced pressure to thereby obtain a solid acid-modified polyolefin. The results of infrared absorption spectroscopy revealed that the total content of maleic anhydride and maleic acid was 1.5 mass %. The weight average molecular weight was 83000 as measured by high temperature GPC.

Production Example 2

The procedure of Production Example 1 was followed except for using 280 g of propylene-ethylene copolymer (ethylene content=5.9 mol %), 12 g of maleic anhydride, 5.6 g of di-tert-butyl peroxide, and 420 g of toluene, to obtain a solid acid-modified polyolefin. The results of infrared absorption spectroscopy revealed that the total content of maleic anhydride and maleic acid was 0.9 mass %. The weight average molecular weight was 154000 as measured by high temperature GPC.

Production Example 3

The procedure of Production Example 1 was followed except for using 280 g of propylene-ethylene copolymer (ethylene content=50 mol %), 70 g of maleic anhydride, 5.6 g of di-tert-butyl peroxide, and 420 g of toluene, to obtain a solid acid-modified polyolefin. The results of infrared absorption spectroscopy revealed that the total content of maleic anhydride and maleic acid was 5.1 mass %. The weight average molecular weight was 45000 as measured by high temperature GPC.

Example 1

Production Of Aqueous Resin Composition (a)

Seventy five grams of acid-modified polyolefin obtained in Production Example 1, 105 g of methyl methacrylate, 105 g of n-butyl acrylate, 15 g of 2-hydroxyethyl methacrylate, and 18 g of polyoxyethylene styrenated phenyl ether (product of Dai-Ichi Kogyo Seiyaku Co., Ltd., tradename "Noigen EA-197", nonionic surfactant) were added to a two-liter four-necked flask equipped with a condenser, thermometer, stirrer, and dropping funnel, and fully dissolved while being maintained at 100° C. N,N-Dimethylethanolamine (1.2 g) was added to the resulting solution, followed by stirring for 15 minutes. Subsequently, 710 g of deionized water previously heated to 95° C. was added dropwise via the dropping funnel with vigorous agitation over 30 minutes, to perform phase inversion emulsification of the acid-modified polyolefin. After cooling the emulsion to 80° C., nitrogen was introduced to thoroughly purge the system with nitrogen. An aqueous solution of 0.9 g of ammonium persulfate in 30 g of deionized water was then added while maintaining the system at 80° C., to initiate polymerization under a nitrogen stream. The reaction was performed at 80° C. for 8 hours under a nitrogen stream, followed by cooling. Aqueous resin composition (a) having a resin concentration (solids content) of 30 mass % and a mean resin particle diameter of 0.13 μm was thus obtained.

Example 2

Production Of Aqueous Resin Composition (b)

The procedure of Example 1 was followed except that the components were used in the amounts shown in Table 1, to obtain aqueous resin composition (b) having a resin concentration (solids content) of 30 mass % and a mean resin particle diameter of 0.11 μm.

Example 3

Production Of Aqueous Resin Composition (c)

The procedure of Example 1 was followed except that the components were used in the amounts shown in Table 1, to obtain aqueous resin composition (c) having a resin concentration (solids content) of 30 mass % and a mean resin particle diameter of 0.15 μm.

Example 4

Production Of Aqueous Resin Composition (d)

Fifteen grams of acid-modified polyolefin obtained in Production Example 2, 45 g of cyclohexyl methacrylate, and 9 g of polyoxyethylene lauryl ether (product of Dai-Ichi Kogyo Seiyaku Co., Ltd., tradename "DKS NL-180", nonionic surfactant) were added to a two-liter four-necked flask equipped with a condenser, thermometer, stirrer, and dropping funnel, and fully dissolved while being maintained at 100° C. N,N-Dimethylethanolamine (0.2 g) was added to the resulting solution, followed by stirring for 15 minutes. Subsequently, 700 g of deionized water previously heated to 95° C. was added dropwise via the dropping funnel with vigorous agitation over 30 minutes, to perform phase inversion emulsification of the acid-modified polyolefin. After cooling the emulsion to 80° C., nitrogen was introduced to thoroughly purge the system with nitrogen. An aqueous solution of 0.8 g of ammonium persulfate in 20 g of deionized water was then added while maintaining the system at 80° C., to initiate polymerization under a nitrogen stream. After performing the reaction at 80° C. for 3 hours under a nitrogen stream, a mixture of 210 g of n-butyl acrylate, 20 g of 2-hydroxyethyl methacrylate, and 10 g of methacrylic acid was added dropwise via the dropping funnel over 2 hours. After completion of the addition, the reaction was continued for a further 4 hours at 80° C., followed by cooling. Aqueous resin composition (d) having a resin concentration (solids content) of 30 mass % and a mean resin particle diameter of 0.18 μm was thus obtained.

Comparative Example 1

Production Of Aqueous Resin Composition (e)

The procedure of Example 1 was followed except that the components were used in the amounts shown in Table 1, to obtain aqueous resin composition (e) having a resin concentration (solids content) of 30 mass % and a mean resin particle diameter of 0.09 μm.

Comparative Example 2

Production Of Aqueous Resin Composition (f)

The procedure of Example 1 was followed except for using the components in the amounts shown in Table 1, in an attempt to produce aqueous resin composition (f). However, since the proportion of polymerizable monomer to acid-modified polyolefin was small, the acid-modified polyolefin was not sufficiently dissolved, making it impossible to perform phase inversion emulsification.

The abbreviations used in Table 1 indicate the following. MMA: methyl methacrylate; n-BA: n-butyl acrylate; CHMA: cyclohexyl methacrylate; 2-HEMA: 2-hydroxyethyl methacrylate; MAA: methacrylic acid.

(2) Water Resistance

A test plate obtained by the method described in (1) above was immersed in warm water at 40° C. for 240 hours, and evaluated by the method described in (1) above.

(3) Storage Stability

Eighty grams of aqueous resin composition was sealed in a 100 ml container and allowed to stand in an atmosphere at 50° C. for 2 weeks, and then the change in viscosity was evaluated according to the following scale.

A: Somewhat thickened (less than twice the initial viscosity)
B: Thickened (at least twice the initial viscosity)

(4) Compatibility with Other Resins

Mixtures obtained by adding "Super Flex 150HS" (polyurethane emulsion manufactured by Dai-Ichi Kogyo Seiyaku Co., Ltd.; solids content: 38 mass %) or "Primal 2133" (acrylic emulsion manufactured by Rohm and Haas Japan, K.K.; solids content: 41.5 mass %) to an aqueous resin composition at a mass ratio of 1:1 on a solids basis, were applied to glass plates with a 50 μm applicator, and dried at 80° C. for 30 minutes. After drying, the condition of each glass plate was visually observed and evaluated according to the following scale.

A: The coating film was transparent
B: The coating film was turbid

TABLE 1

|  |  | Ex. 1 | Ex. 2 | Ex. 3 | Ex. 4 | Comp. Ex. 1 | Comp. Ex. 2 |
|---|---|---|---|---|---|---|---|
| Aqueous resin composition |  | (a) | (b) | (c) | (d) | (e) | (f) |
| Acid-modified polyolefin (g) | Production Example 1 | 75 |  |  |  |  |  |
|  | Production Example 2 |  | 100 |  | 15 | 10 | 265 |
|  | Production Example 3 |  |  | 240 |  |  |  |
| Polymerizable monomer (g) | MMA | 105 | 105 |  |  | 140 |  |
|  | n-BA | 105 | 80 | 15 | 210 | 140 | 35 |
|  | CHMA |  |  | 45 | 45 |  |  |
|  | 2-HEMA | 15 | 15 |  | 20 | 10 |  |
|  | MAA |  |  | 3 | 10 | 5 |  |
| Acid-modified polyolefin/polymerizable monomer (mass ratio) |  | 100/300 | 100/200 | 100/26 | 100/1900 | 100/2950 | 100/13 |
| Noigen EA-197 (g) |  | 18 | 30 |  |  |  | 110 |
| DKS NL-180 (g) |  |  |  | 20 | 9 | 2.5 |  |
| N,N-Dimethylethanolamine (g) |  | 1.2 | 0.8 | 10.9 | 0.2 | 0.12 | 12.0 |
| Deionized water (g) |  | 710 | 750 | 730 | 700 | 700 | 930 |
| Ammonium persulfate (g) |  | 0.9 | 0.6 | 0.2 | 0.8 | 0.8 | — |
| Deionized water (g) |  | 30 | 20 | 20 | 20 | 20 | — |
| Mean particle diameter (μm) |  | 0.13 | 0.11 | 0.15 | 0.18 | 0.09 | Not dispersed |

The following properties of aqueous resin compositions (a) to (e) obtained in Examples 1 to 4 and Comparative Example 1 were evaluated. Table 2 shows the results.

(1) Adhesion

Three grams of dipropylene glycol monomethyl ether as a film formation auxiliary and 1 g of "Surfinol 420" (product of Air Products Japan, Inc.) as a wetting agent were added to 100 g of aqueous resin composition, followed by stirring for 30 minutes with a magnetic stirrer. The emulsion was applied by spray coating to a polypropylene plate [a plate obtained by press-molding "SB-E3" (product of Mitsui Noblen) by a standard method; 100 mm×50 mm, 2 mm in thickness] washed with isopropyl alcohol, to a dry film thickness of 20 to 25 μm. After drying at 60° C. for 30 minutes, the plate was allowed to stand for 24 hours in an atmosphere at 25° C. and an RH of 60%, to obtain a test plate. Cuts reaching the substrate were made at intervals of 1 mm on the test plate so as to form 100 squares. Cellophane tape was adhered to the cut surface and then peeled off at an angle of 90° C. relative to the coating surface, and the number of remaining squares was determined.

TABLE 2

| | | Evaluation item | | | | |
|---|---|---|---|---|---|---|
| | Aqueous | | | | Compatibility | |
| | resin composition | Adhesion | Water resistance | Storage stability | Super Flex 150HS | Primal 2133 |
| Ex. 1 | (a) | 100 | 100 | A | A | A |
| Ex. 2 | (b) | 100 | 100 | A | A | A |
| Ex. 3 | (c) | 100 | 100 | A | A | A |
| Ex. 4 | (d) | 100 | 100 | A | A | A |
| Comp. Ex. 1 | (e) | 40 | 30 | A | A | A |

As is apparent from Table 2, aqueous resin compositions (a) to (d) obtained in Examples 1 to 4 have high water resistance, excellent storage stability, and excellent compatibility with other resins, in addition to good adhesion. In contrast, aqueous resin composition (e) containing an acid-modified polyolefin and polymerizable monomers at a ratio outside the scope of the present invention, i.e., containing too small an amount of acid-modified polyolefin, is inferior in adhesion and water resistance.

The invention claimed is:

1. An aqueous resin composition obtained by dissolving 100 parts by mass of acid-modified polyolefin and 5 to 60 parts by mass of surfactant in 15 to 1900 parts by mass of polymerizable monomer, adding water in the presence of basic compound to perform phase inversion emulsification, and then polymerizing the polymerizable monomer wherein the resin has a mean particle diameter of not more than 0.5 µm.

2. The aqueous resin composition according to claim 1, wherein the acid-modified polyolefin has a weight average molecular weight of 3000 to 200000 as measured by high temperature GPC.

3. The aqueous resin composition according to claim 1, wherein the acid-modified polyolefin is obtained by graft-copolymerizing with a polyolefin 0.4 to 10 mass % of at least one member selected from unsaturated carboxylic acids and anhydrides thereof.

4. A process for producing an aqueous resin composition, the process comprising dissolving 100 parts by mass of acid-modified polyolefin and 5 to 60 parts by mass of surfactant in 15 to 1900 parts by mass of polymerizable monomer, adding water in the presence of basic compound to perform phase inversion emulsification, and then polymerizing the polymerizable monomer.

5. A paint for polyolefin films, sheets or molded articles, the paint comprising the aqueous resin composition according to claim 1 as an active ingredient.

6. An ink for polyolefin films, sheets or molded articles, the ink comprising the aqueous resin composition according to claim 1 as an active ingredient.

7. An adhesive for polyolefin films, sheets or molded articles, the adhesive comprising the aqueous resin composition according to claim 1 as an active ingredient.

8. A sealant for polyolefin films, sheets or molded articles, the sealant comprising the aqueous resin composition according to claim 1 as an active ingredient.

9. A primer for polyolefin substrates, the primer comprising the aqueous resin composition according to claim 1 as an active ingredient.

10. An aqueous resin composition obtained by dissolving 100 parts by mass of acid-modified polyolefin and 5 to 60 parts by mass of surfactant in a first polymerizable monomer, adding water in the presence of basic compound to perform phase inversion emulsification, polymerizing the first polymerizable monomer to form a resin composition, adding a second polymerizable monomer to the resin composition, and then polymerizing the second polymerizable monomer;
the first and second polymerizable monomers being used in a total amount of 15 to 1900 parts by mass per 100 parts by mass of the acid-modified polyolefin wherein the resin has a mean particle diameter of not more than 0.5 µm.

11. The aqueous resin composition according to claim 10, wherein the acid-modified polyolefin has a weight average molecular weight of 3000 to 200000 as measured by high temperature GPC.

12. The aqueous resin composition according to claim 10, wherein the acid-modified polyolefin is obtained by graft-copolymerizing with a polyolefin 0.4 to 10 mass % of at least one member selected from unsaturated carboxylic acids and anhydrides thereof.

13. A process for producing an aqueous resin composition, the process comprising the steps of dissolving 100 parts by mass of acid-modified polyolefin and 5 to 60 parts by mass of surfactant in a first polymerizable monomer, adding water in the presence of basic compound to perform phase inversion emulsification, polymerizing the first polymerizable monomer to form a resin composition, adding a second polymerizable monomer to the resin composition, and polymerizing the second polymerizable monomer;
the first and second polymerizable monomers being used in a total amount of 15 to 1900 parts by mass per 100 parts by mass of the acid-modified polyolefin.

14. A paint for polyolefin films, sheets or molded articles, the paint comprising the aqueous resin composition according to claim 10 as an active ingredient.

15. An ink for polyolefin films, sheets or molded articles, the ink comprising the aqueous resin composition according to claim 10 as an active ingredient.

16. An adhesive for polyolefin films, sheets or molded articles, the adhesive comprising the aqueous resin composition according to claim 10 as an active ingredient.

17. A sealant for polyolefin films, sheets or molded articles, the sealant comprising the aqueous resin composition according to claim 10 as an active ingredient.

18. A primer for polyolefin substrates, the primer comprising the aqueous resin composition according to claim 10 as an active ingredient.

* * * * *